United States Patent [19]

Rueff et al.

[11] 4,092,721
[45] May 30, 1978

[54] APPARATUS FOR CONTROLLING AND ADJUSTING THE WEIGHT OF DOSES OF A LOOSE PRODUCT IN A ROTATING METERING HEAD

[76] Inventors: Herbert Richard Rueff, Via Anna Frank, 10, Croce di Casalecchio (Prov. of Bologna); Sergio Vivi, Via Pasubio, 26, Bologna, both of Italy

[21] Appl. No.: 735,712

[22] Filed: Oct. 26, 1976

[30] Foreign Application Priority Data

Oct. 29, 1975 Italy .................................. 3575 A/75

[51] Int. Cl.² ............................................ G01G 13/02
[52] U.S. Cl. ...................................... 364/479; 222/77; 177/50; 141/196
[58] Field of Search ...................... 235/151.13; 177/50; 222/77; 141/196

[56] References Cited

U.S. PATENT DOCUMENTS

| | | | |
|---|---|---|---|
| 2,664,557 | 12/1953 | Sargrove | 235/151.13 |
| 2,679,639 | 5/1954 | Locher | 235/151.13 X |
| 2,716,534 | 8/1955 | Howard | 141/83 X |
| 3,100,584 | 8/1963 | Bauder | 141/196 X |
| 3,862,408 | 1/1975 | Bolt | 235/151.13 |

*Primary Examiner*—Eugene G. Botz
*Attorney, Agent, or Firm*—Guido Modiano; Albert Josif

[57] ABSTRACT

Apparatus for controlling and adjusting the weight of doses of a loose product in a rotating metering head having telescoping volumetric members distributed therearound. The apparatus includes a rotating control head having a set of sample telescoping volumetric members. A main duct feeds the product to the metering head. A secondary duct is branched off the main duct to feed the control head. A scale is operative to receive individual sample doses as provided by the telescoping members of the control head and to discharge them, after the weighing thereof has been completed, to the metering head. A control assembly adjusts in a concurrent proportional mode the volume of the telescoping members of the metering and control heads according to the weight variations of the weighed product versus the scale reference value. Associated with the scale is an electromechanical transducer having, upon each weighing step of the sample doses, an output signal the level and direction whereof vary in a directly proportional manner with the weight deviation of the sample dose from the scale reference weight. An electronic computer is connected between the transducer and the control assembly and is operative to convert the signals from the transducer into pulses activating the assembly such as to adjust the volumes of the telescoping members of the metering head and control head and eliminate the deviation in the doses supplied thereby.

2 Claims, 4 Drawing Figures

APPARATUS FOR CONTROLLING AND ADJUSTING THE WEIGHT OF DOSES OF A LOOSE PRODUCT IN A ROTATING METERING HEAD

BACKGROUND OF THE INVENTION

This invention relates to an apparatus for controlling and adjusting the weight of doses of a loose product in a rotating metering head having telescoping volumetric members.

A class of products of the kind mentioned above, the packaging whereof is carried out automatically on a mass production basis, is that of the household detergents which are known to lack constant density. As the product is supplied to said metering heads, remarkable density variations may occur therein, even in a comparatively short time period. In order to discharge doses or amounts having a desired weight into containers, the capacity of such telescoping members effecting the volume metering of the variable density products has to be varied as an inverse function of the product density variations.

As is known, a control head has been added accordingly to the metering heads, which control head also rotates and presents a sample telescoping member whereto the product is delivered from a branched line off the metering head main feed duct.

The dose, as provided by the sample telescoping member, is discharged cyclically to a scale which compares its weight to a corresponding reference weight, to then remove the dose. At each weighing step, a set of electrical contacts, cooperating with the scale, first detect whether there exists any appreciable deviation of the actual weight from the reference one; should the deviation detected be of appreciable magnitude, those same contacts are operative to sense whether this is in excess of defect (i.e. the direction of the deviation) with respect to the reference weight, and moreover, whether the deviation is lower or higher than a given absolute value.

With such contacts, furthermore, a control assembly is interlocked for adjusting the volumes of both the telescoping metering members and sample telescoping member, the interlocking being obviously programmed such that the cutting in of the adjusting members has a tendency to eliminate the deviation sensed, i.e. to either increase or decrease the telescoping member capacities as the product density respectively decreases or increases. In fact, it is on the deviation direction that the direction of the adjusting member action depends, while a shorter or longer duration of such cutting in, and correspondingly smaller or larger amount of adjustment, would depend on whether the deviation is smaller or larger than said given amount.

Now, the control and adjustment member stage, so conceived, is neither adequately effective nor sufficiently accurate to meet the requirements of the current variable density loose product packaging field.

SUMMARY OF THE INVENTION

The instant apparatus pursues the object of obviating such shortcomings, and in particular aims at obtaining a continuous type of information rather than a step-like one on the relative density variations in the product being controlled and at applying that information such as to adjust, in a correspondingly continuous mode, the telescoping metering member capacities when the members are delivered with a product exhibiting a density equal to that of the product being controlled.

This object is achieved by an apparatus for controlling and adjusting the weight of doses of a loose product in a rotating metering head having telescoping volumetric members distributed therearound, the apparatus including a rotating control head having a set of sample telescoping volumetric members, a main duct feeding said product to said metering head, a secondary duct branched off the main duct to feed said control head, a scale operative to receive individual sample doses as provided by the telescoping members of the control head and to discharge them, after the weighing thereof has been carried out, to the metering head, a control assembly for adjusting, in a concurrent proportional mode, the volume of the telescoping members of the metering and control heads according to the weight variations of the weighed product versus the scale reference value, characterized in that there is associated to said scale an electromechanical transducer having, upon each weighing step of said sample doses, an output signal the level and direction whereof vary in a directly proportional manner with the weight deviation of the sample dose from the scale reference weight, that an electronic computer is connected between said transducer and said control assembly and is operative to convert said signals from the transducer into pulses activating the assembly such as to adjust the volumes of the telescoping members of the metering head and control head and eliminate said deviation in the doses supplied thereby and such that, in order for the adjustment of the metering head telescoping member volumes to be completed just before the introduction therein of the product of equal density weighed on the scale and determining said adjustment, the ratio $n/N$ of the control head rpm $n$ and metering head rpm $N$ is substantially equal to, $$\frac{V}{v} \times \frac{B}{b} \times \frac{m}{M + m}$$

where:

$V$ is the volume of one metering head telescoping member;

$B$ is the number of metering head telescoping members;

$v$ is the volume of one control head telescoping member;

$b$ is the number of control head telescoping members;

$m$ is the product volume present in the secondary duct and control head; and $M$ is the product volume present in the main duct and metering head.

BRIEF DESCRIPTION OF THE DRAWINGS

Further features will be more apparent from the ensueing description of a preferred embodiment of the invention, illustrated by way of example in the accompanying drawings, where:

FIG. 1a is a detail view of the heads shown in FIG. 1;

DESCRIPTION OF THE PREFERRED EMBODIMENTS

Figure 1:
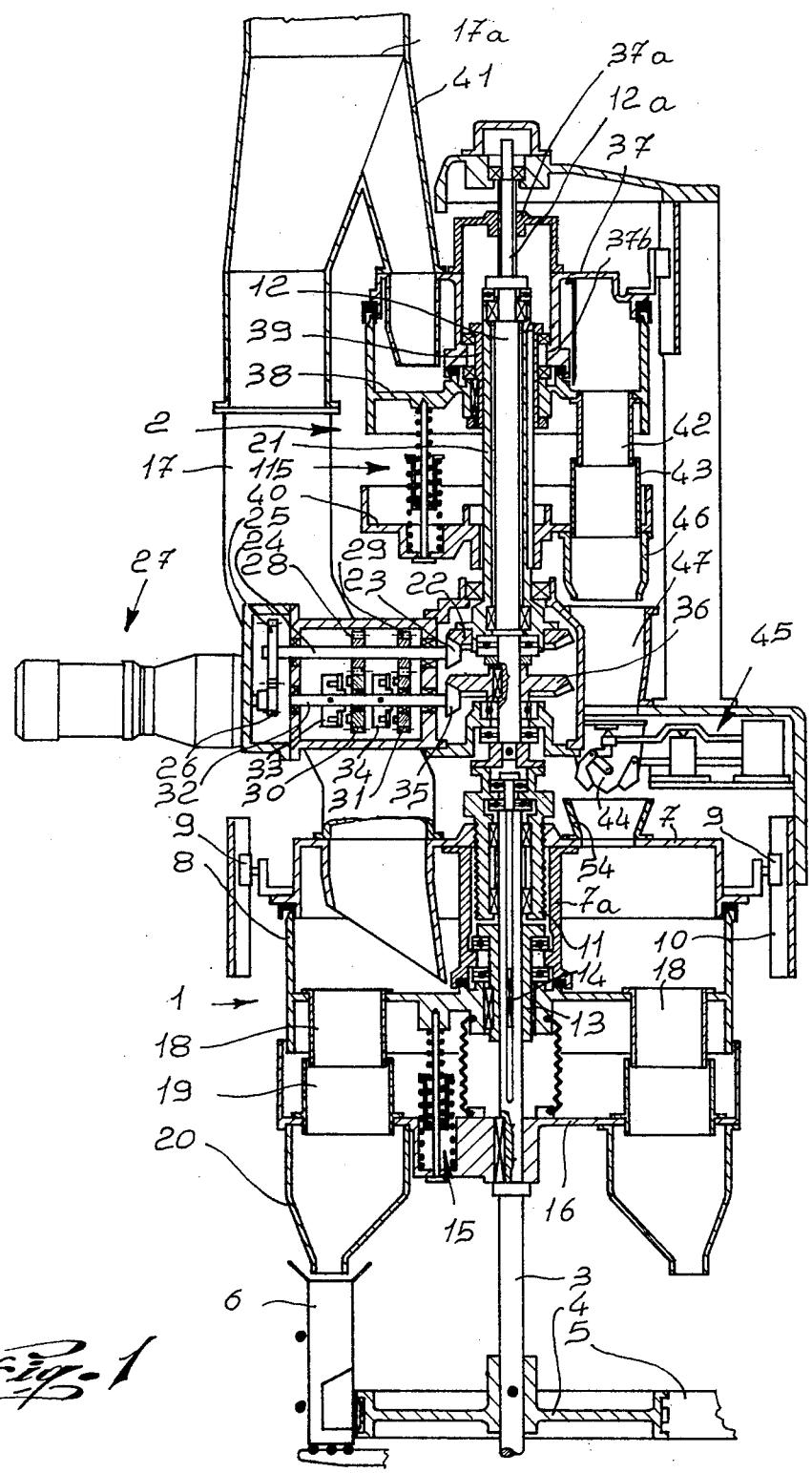
FIG. 1 is an axially cut vertical sectional view of the metering head and control head.

Making reference first to FIGS. 1 and 1a, a metering head 1 for such loose products, either in powder or granules, and a control head 2 controlling the density variations of the product being processed, are mounted coaxially with a vertical shaft 3, to the bottom portion whereof a toothed pulley 4 is keyed wherearound a belt 5 runs, which is operative to convey containers 6 arranged to receive the product doses. A motor drives the shaft 3 rotationally through a speed transmission, thereby the shaft 3 rpm may be varied in steps. At the shaft 3 top, a cover 7 is provided for a pan 8 of the metering head 1, which cover, owing to its outer shoes 9 being in engagement with fixed guides 10, is only allowed to slide in a vertical direction. For the vertical sliding movement of the cover 7, the hub of the latter forms the female thread for the threaded portion of a sleeve 11 pivotally mounted to the shaft 3 and rigidly connected to the bottom end of a control shaft 12, extending above the shaft 3 in alignment therewith. The pan 8 rotates at the same speed as the shaft 3, and follows the vertical sliding movements of the cover 7; the pan being, in fact, keyed to the sleeve 13, which being formed with keys 14 engaging grooves in the shaft 3 is driven to rotate by the latter, while being slidable with respect thereto; furthermore, a shoulder in the sleeve 7a, rigid and coaxial with the cover 7, engages through intervening thrust bearings between the sleeve 13 and the pan 8 hub. Elastic suspensions 15, intervening between a disc 16 rigid with the shaft 3 and the pan 8, contribute to the supporting of the pan 8, thus relieving the sleeve 7a and cover 7 of the load whereof. The product to be delivered to the containers 6 in doses of a given weight, reaches the pan 8 through the duct 17 which terminates within the cover 7 wherewith, according to the invention, it is rigid. At the bottom of the pan 8, the top of a set of bushings 18 opens, which bushings are distributed evenly all around the pan and are inserted with their bottom end into the top of respective bushings 19 mounted so as to pass through the disc 16. The vertically fixed bushings 19 and the bushings 18, which are movable vertically, constitute the two-piece telescoping members, which form volume-wise doses to be supplied to the containers 6 through respective funnels 20. The funnels are attached under the disc 16 and have their discharge mouth overlying and timed with respective containers 6 associated with the pulley 4. In order to form the doses, provision is made in the pan 8 for special levelers to level the product at the bushing 18 inlet height, while the bushings 19 are closed at the bottom by a specially provided door, which is then caused to open for delivering the dose (the levelers, doors and opening mechanism have all been omitted as they are known per se). A tube 21 is pivotally mounted to the shaft 12, the tube 21 having keyed to its lower end a bevel gear wheel 22; said gear wheel meshes with a pinion 23 on the driven shaft 24 through a gear 25-26, under the drive provided by a motor assembly 27. On the shaft 24, there are keyed two gear wheels 28 and 29 which transmit the motion to respective wheels 30 and 31, one in direct drive engagement and the other through an idler, not shown. The wheels 30 and 31 are idle on the shaft 32, which is pivotally carried and has two electromagnetic clutches 33 and 34 keyed thereto. When the clutch 33 is energized, the wheel 30 becomes rigid therewith, thereby the shaft 32 rotates in one direction; by contrast, when it is the clutch 34 which is energized, the wheel 31 becomes rigid therewith, and the shaft 32 rotates in the opposite direction. Thus, by meshing the pinion 35 of the shaft 32 with the bevel gear wheel 36 keyed to the drive shaft 12, the latter may be driven to rotate in one direction or the other.

The cover 37 of the pan 38 of the control head 2 is still only slidable vertically and the movements thereof in the vertical direction are determined by the threaded portion 12a of the shaft 12, which engages with the female thread formed in the hub 37a of the cover. The pan 38 is keyed onto the sleeve 39, which is provided with keys to slide axially along the tube 21 and to be driven thereby into rotation; the pan 38 follows the vertical sliding movements of the cover 37, owing to its being engaged, through intervening thrust bearings, by the shoulder 37b in the cover 37. To the supporting of the pan 38, there contribute elastic suspensions 115 resting on the underlying disc 40, which is keyed to the tube 21. The product reaches the pan 38 of the control head 2 from the secondary duct 41, branching off the upper section of the duct 17. The sample telescoping members (generally two in number) are comprised of bushings 42 projecting outwardly from the pan 38 bottom and inserted in corresponding bushings 43 extending upwardly from the disc 40 and provided at the bottom with openable doors. The sample doses, as formed by the telescoping members 42-43, are cyclically discharged to a hopper 44, fitted with an openable bottom, of a scale 45, the mount whereof is fixed and will be described hereinafter. The discharging occurs as the funnel 46, applied under the disc 40 at the bushing 43, comes into an overlying relationship with a stationary or fixed funnel 47. The control head 2 cycle is followed by a set of cams 48 keyed to the shaft 49 which receives its motion from the shaft 52 through the gearing 50-51, the pinion 53 of the shaft 52 meshing with the bevel gear wheel 22 which drives into rotation the tube 21 and thus the control head 2. One of the cams 48 determines the opening of the hopper 44 after the scale 45 has carried out the weighing of a sample dose. The sample dose weighed is then discharged, through the funnel 54, into the pan 8 of the metering head 1. It should be noted that, according to the invention, the pitch of the threaded portion 12a of the shaft 12 and the pitch of the sleeve 11 screw are identical, thereby, to a rotation in one direction or the other by the shaft 12, there corresponds an equal decrease or increase of the depths both of the telescoping members 18-19 and members 42-43. The secondary duct 41, rigid with the duct 17, is also rigid with the cover 37 of the control head 2; the ducts 41 and 17, accordingly, follow the equal vertical movements of of the covers 37 and 7. Above the horizontal section 17a, from where the secondary duct 41 branched portion off the duct 17 starts, the tube 17 is connected to the fixed hopper feeding the two heads 1 and 2 with the product; such a connection is implemented through an axially deformable section which allows for the ducts 17 and 41 to follow said vertical movements of 7 and 37. The delivery of the product from the hopper to the ducting 17-41 is so implemented as to have the duct at all times filled at least up to the section 17a.

A first condition which must be satisfied in the control and adjustment apparatus described above is expressed by equation (I), $$\frac{n}{N} = \frac{B}{b} \times \frac{V}{v} \times \frac{m}{m+M}$$

where the symbols used have the following meanings;
- $n$ is the revolutions in the unit time by the control head 2 (parts 38–40);
- $N$ is the revolutions in the unit time of the metering head 1 (parts 8–16);
- $B$ is the number of telescoping members 18–19 in the metering head 1;
- $b$ is the number of telescoping members 42–43 of the control head 2;
- $V$ is the average volume of one telescoping member 18–19;
- $v$ is the average volume of one sample telescoping member 42–43;
- $m$ is the product volume which on being directed to the sample telescoping members in operation is to be found between the section 17a and the inlet level of the bushings 42; and
- $M + BV$ is the volume of product which on being directed to the telescoping members 18–19 in operation is to be found between the section 17a and the inlet level of the bushings 18.

As described hereinafter, when the scale 45, by comparing the reference weight with that of a product dose supplied thereto by a telescoping member 42–43, indirectly detects that the product has varied in density, determines a concurrent and corresponding adjustment of the depth, and accordingly of the capacity, both of the members 42–43 and members 18–19, thereby to the fresh capacities of the former and latter members there still correspond sample doses with weights equal to the reference weight, and respectively doses with face weights for delivery to the containers 6. Now, by satisfying the condition (I), it occurs that if the scale 45 detects a density variation in the product, as the product having the same density is on the point of being metered by the bushings 18–19, the latter capacities are already correspondingly adjusted by the scale. In fact, in the time lapse wherein the metering head 1 performs one revolution, the sample telescoping members 42–43 withdraw from the duct 41 a product volume equal to $vbn/N$, and the telescoping members 18–19 withdraw from the duct 17 a product volume equal to VB-($vbn/N$), i.e. lower than their capacities by the volume product passing to the head 1 from the head 2. The product extant in the section 17a reaches, therefore, the inlet level of the bushings 42–43 after the metering head 1 has performed a number of revolutions equal to $mN/vbn$. Along the duct 17, by contrast, after a metering head number of revolutions equal to M:(VB-$vbn/N$), the product from the section 17a reaches inside the pan 8 a level such that, after a further revolution by the metering head, it appears before the inlet to the bushing 18–19. Thus, in order for the scale to effect the adjustment in good time, it is necessary that the two cited numbers of revolutions be equal to each other; from the following equality relationship, $$\frac{m}{\frac{vbn}{N}} = \frac{M}{VB - \frac{vbn}{N}}$$

the equation (I) is thus arrived at. It may be noted that, upon the setting of a particular job on a given packaging machine, the form coefficients $m$ and M are practically determined, as well as the speed of N of the metering head 1, and, according to the size of the containers 6, the numbers $b$ and B and volumes $v$ and V of the telescoping members. In order to satisfy the condition (I), there only remains to adjust the value $n$ of the control head 2 speed. To this end, it will be apparently convenient to have, according to the invention, the motor assembly 27 to comprise a three-phase asynchronous motor cooperating with a continuous type of mechanical variator, or alternatively, a variable speed DC motor, to be controlled through a controlled diode actuator and equipped with a speed-indicating instrument or gauge.

In the inventive apparatus, moreover, it is mandatory that the relationship (II) be also satisfied, $$\frac{D_1}{D_2} = \frac{D_3}{D_4}$$

where $D_1$, $D_2$, $D_3$, and $D_4$ are respectively the diameters of the cylindrical bushings 42, 43, 18 and 19. It is pointed out, indeed, that H is the equal depth of the bushings 42 and 18, and $h$ is the distance both between the bottom bases of the bushings 42–43 and between the bottom bases of the bushings 18 and 19. Furthermore, it should be noted that for a variation $d\gamma$ in the product specific gravity, $h$ has a variation $-dh$, whereby the product weight that the telescoping members 42–43 are designed to contain does not vary, and remains unvaried the product weight which the telescoping members 18–19 are designed to contain. This unvaried weight in the telescoping members 42–43 and 18–19 is obtained when, there occurring the variations $d\gamma$ and $-dh$, the following relationship hold true, $$\frac{D_1^2}{4} \pi H [\gamma - (\gamma + d\gamma)] + \frac{D_2^2}{4} \pi [h\gamma - (h - dh)(\gamma + d\gamma)] = 0$$

or similar relationship substituting $D_3$ and $D_4$ for $D_1$ and $D_2$, i.e. if the relationship (II) is obtained through easily carried out passages and substitutions.

Figure 2:
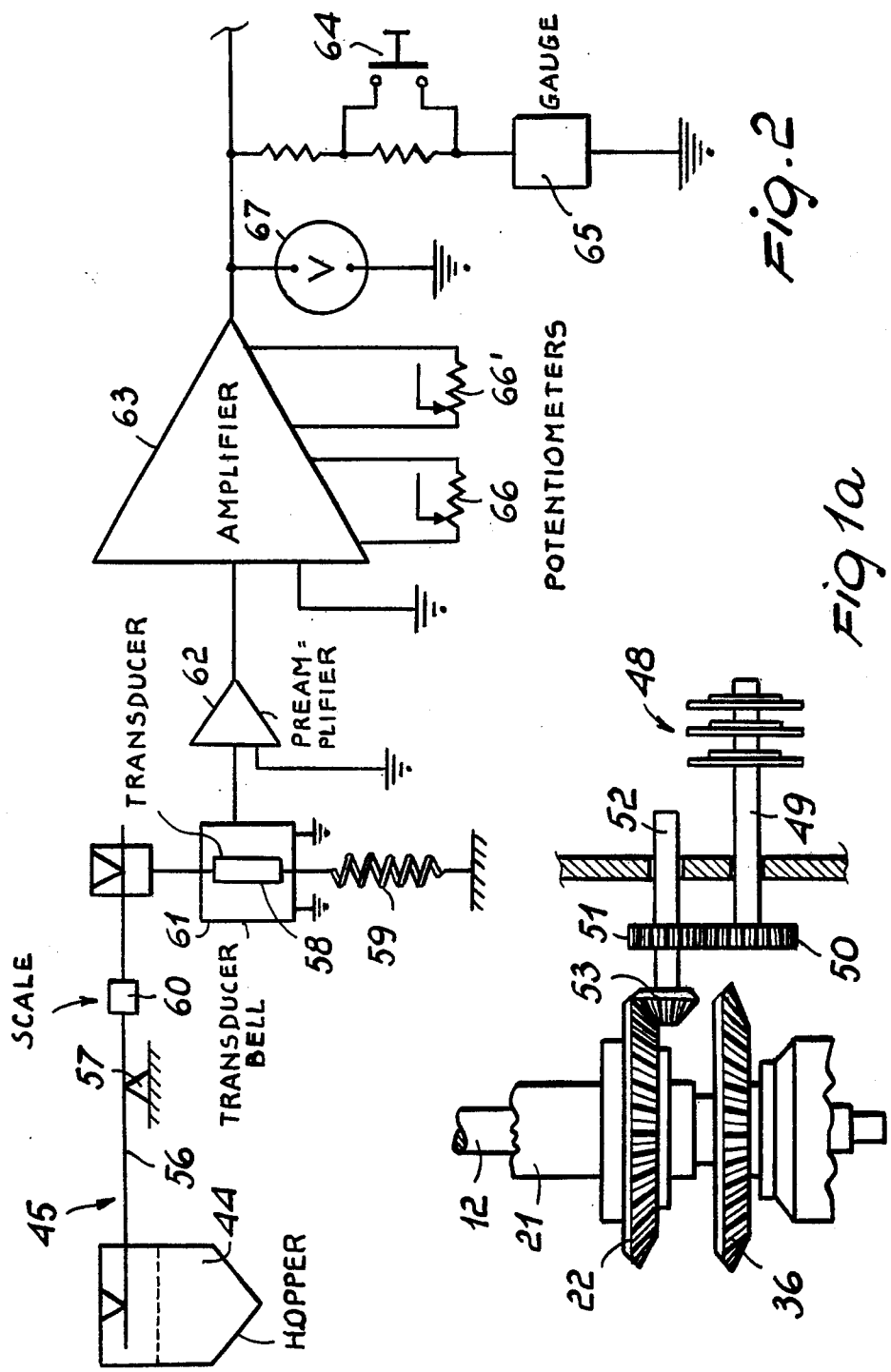
FIG. 2 shows schematically the weight checking scale, together with the transducer and amplifier circuit for the transducer output signal.

Making now reference to the schematic representation of FIG. 2, it may be observed that the electromechanical scale 45 has a yoke 56 arranged to swing about a fixed fulcrum 57. To a first end of the yoke the hopper 44 with the openable bottom is brought, whereas to the second end thereof an electromechanical position transducer 58 is connected of an electromagnetic type. When the hopper 44 contains product for a weight $\gamma v$, i.e. the reference weight, the hopper is in a balanced condition by virtue of a respective spring 59 intervening between said second end and a stationary point, and of an adjustable weight 60. In actual practice, when the hopper 44 receives a sample dose from a telescoping member 42–43, and viceversa when it opens to pour the dose into the funnel 54, the movements thereof and the oscillations of the yoke 56 are effectively prevented, a special support being in operative position by virtue of one of the cams 48, which then determines the removal thereof when the scale 45 is to perform the weighing. To the output of the cell 61 of the transducer 58, a preamplifier 62 is connected and then an amplifier 63. When the scale 45 is calibrated initially, in the presence of the product weight $\gamma v$ in the hopper 44, the weight 60 is adjusted until, on depressing a button 64, the gauge 65, located downstream of the amplifier 63, senses the absence of a signal from the cell 61. Once the maximum absolute value of the deviation Δγ for γ is determined, wherewithin the instant apparatus is designed to operate, in the presence of the weights (γ ± Δγ)v in the hopper 44, the potentiometers 66 of the amplifier 63 are adjusted such that, on connecting downstream of the same a voltmeter 67, the latter shows the maximum working output signal from the amplifier, either as a plus or minus; within this operation range the amplifier output signals will then vary in amplitude and direction in a directly proportional manner to the deviation of the sample dose actual weight from the reference weight.

Figure 3:
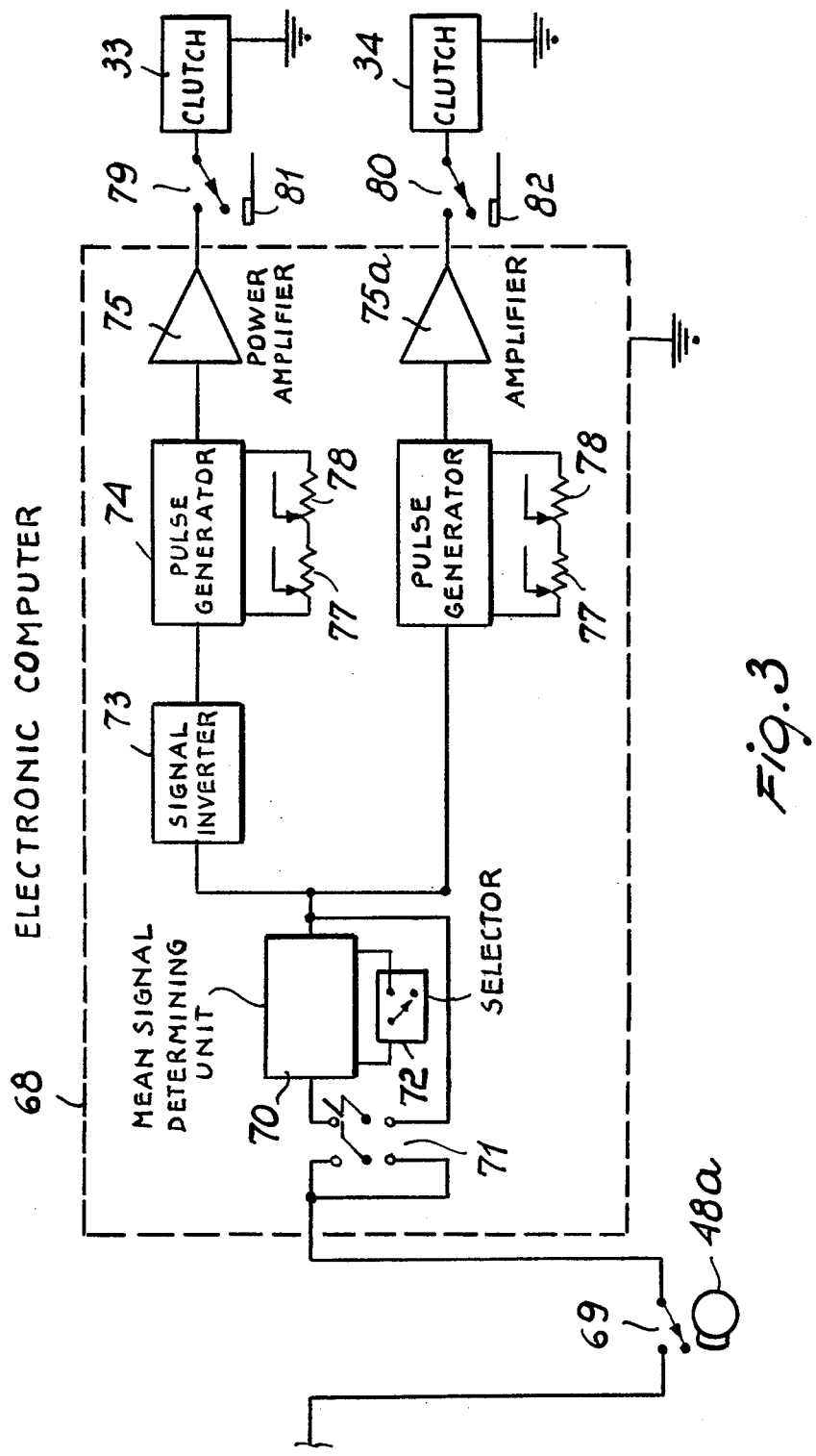
FIG. 3 is a block diagram of the computer.

During the packaging process, the amplifier output signals enter the electronic computer 68 (FIG. 3), following the consent by the cam 48a of the set 48, which closes the microswitch 69 only after a time lapse such that the scale 45, having received a sample dose and being in a released condition, is enabled to reach an equilibrium position.

A unit 70 forms part of the computer 68 which is adapted to effect the mean of several signals from the scale; such a unit may be bypassed through a bypass circuit which may be connected by means of a changeover switch 71. By adjustment of its selector 72 within the unit 70, a number of signals to be meaned is set, such a number being in practice equal to nb/N, i.e. equal to the number of signals from the scale in one revolution of the metering head 1. In order to feed the clutch 33 which increases the depth of the telescoping members as negative signals are passed by the scale or, in other words, in the presence of sample doses of insufficient weight, the computer includes next a signal inverter block 73, the output whereof is connected to the input side of a pulse generator 74, the output signal whereof is amplified by a power amplifier 75; in order to feed the clutch 33 which causes the depth of the telescoping members to decrease on receipt of positive signals, the computer further includes a generator 76 and amplifier 77 similar to the preceding 74 and 75. The pulse generators 74 and 76 have a square wave type of output the duration whereof (or duration of the telescoping member depth adjustment) is proportional, according to a constant K, to the amplitude of the signals received. In fact, the coarse adjustment and fine adjustment potentiometers 77 and 78 of the two generators are adjusted to fix the value of K wherefor to the maximum absolute signal amplitude, which may be passed by the amplifier 63 of the transducer 68, there corresponds the maximum duration of the corresponding adjustment of the telescoping members, which maximum duration, on account of the size of the telescoping members, may be calculated as a function of the rpm n and of the ratio in the drive train between the motor assembly 27 and hub 37a. through the shaft 32. The amplifiers 75 and 75a may be transistorized units or, alternatively, controlled diode units, and exhibit a square wave output having the same duration as the generator 74 and 76 pulses, which is passed to the feed voltage of the clutches 33 and 34. The clutches 33 and 34 cannot be fed when the respective microswitches 79 and 80 are driven to open by respective end of travel detents 81 and 82, which are connected to the vertically movable components of the heads 1 and 2, and which monitor accordingly that the maximum and minimum safe depths of the telescoping members have been attained.

We claim:

1. An apparatus for controlling and adjusting the weight of doses of a loose product in a rotating metering head having telescoping volumetric members distributed therearound, the apparatus including a rotating control head having a set of sample telescoping volumetric members, a main duct feeding said product to said metering head, a secondary duct branched off the main duct to feed said control head, a scale operative to receive individual sample doses as provided by the telescoping members of the control head and to discharge them, after the weighing thereof has been completed, to the metering head, a control assembly for adjusting in a concurrent proportional mode the volume of the telescoping members of the metering and control heads according to the weight variations of the weighed product versus the scale reference value, characterized in that there is associated with said scale an electromechanical transducer having, upon each weighing step of said sample doses, an output signal the level and direction whereof vary in a directly proportional manner with the weight deviation of the sample dose from the scale reference weight, than an electronic computer is connected between said transducer and said control assembly and is operative to convert said signals from the transducer into pulses activating the assembly such as to adjust the volumes of the telescoping members of the metering head and control head and eliminate said deviation in the doses supplied thereby and such that, in order for the adjustment of the metering head telescoping member volumes to be completed just before the introduction therein of the product of equal density weighed on the scale and determining said adjustment, the ratio n/N of the control head rpm n and metering head rpm N is substantially equal to:

$$\frac{V}{v} \times \frac{B}{b} \times \frac{m}{M + m}$$

where:
- $V$ is the volume of one metering head telescoping member;
- $B$ is the number of metering head telescoping members;
- $v$ is the volume of one control head telescoping member;
- $b$ is the number of control head telescoping members;
- $m$ is the product volume present in the secondary duct and control head; and
- $M$ is the product volume present in the main duct and metering head.

2. An apparatus according to claim 1, characterized in that said computer comprises a unit adapted to calculate the mean of several output signals from said transducer, and provided with a selector for the number of signals to be meaned, said number being substantially equal to that of the signals which may be obtained during one revolution of said metering head.

* * * * *